(12) United States Patent  
Wellman

(10) Patent No.: US 8,079,232 B2
(45) Date of Patent: Dec. 20, 2011

(54) METHOD AND APPARATUS FOR IMPROVING THE EFFICIENCY OF A HEAT PUMP HVAC SYSTEM

(76) Inventor: Mark Rodney Wellman, Circleville, OH (US)

( * ) Notice: Subject to any disclaimer, the term of this patent is extended or adjusted under 35 U.S.C. 154(b) by 174 days.

(21) Appl. No.: 11/714,346

(22) Filed: Mar. 6, 2007

(65) Prior Publication Data

US 2008/0216497 A1 Sep. 11, 2008

(51) Int. Cl.
*F25B 39/04* (2006.01)
*F25B 1/00* (2006.01)
*F25D 17/06* (2006.01)

(52) U.S. Cl. .................. 62/507; 62/498; 62/428
(58) Field of Classification Search .................. 62/507, 62/498, 428
See application file for complete search history.

(56) References Cited

U.S. PATENT DOCUMENTS

| | | | |
|---|---|---|---|
| 4,178,988 A | 12/1979 | Cann et al. | |
| 4,190,199 A | 2/1980 | Cawley et al. | |
| 4,242,872 A * | 1/1981 | Shaw | 62/235.1 |
| 4,277,946 A | 7/1981 | Bottum | |
| 4,314,601 A | 2/1982 | Giuffre et al. | |
| 4,325,357 A | 4/1982 | Wormser | |
| 4,378,787 A | 4/1983 | Fleischmann | |
| 4,420,034 A | 12/1983 | VanderVaart | |
| 4,427,055 A | 1/1984 | Heavener | |
| 4,438,881 A | 3/1984 | Pendergrass | |
| 4,761,964 A * | 8/1988 | Pacheco | 62/160 |
| 5,353,601 A * | 10/1994 | Palmer | 62/171 |
| 5,473,907 A | 12/1995 | Briggs | |
| 5,533,568 A | 7/1996 | Schuster et al. | |
| 5,701,750 A | 12/1997 | Ray | |
| 5,715,690 A | 2/1998 | Ponder | |
| 5,852,939 A | 12/1998 | Gazes | |
| 6,149,066 A | 11/2000 | Perry et al. | |
| 6,434,969 B1 * | 8/2002 | Sosnowski | 62/419 |
| 2004/0045699 A1 * | 3/2004 | Noah | 165/48.2 |
| 2004/0261441 A1 | 12/2004 | Turner et al. | |
| 2005/0224073 A1 | 10/2005 | Miller et al. | |
| 2005/0268628 A1 | 12/2005 | Thompson | |
| 2006/0053823 A1 | 3/2006 | Taras et al. | |

* cited by examiner

*Primary Examiner* — Frantz F. Jules
*Assistant Examiner* — Cassey D Bauer
(74) *Attorney, Agent, or Firm* — Jason H. Foster; Kremblas & Foster

(57) ABSTRACT

A heating and/or cooling system for a dwelling, including a heat exchanger that is located indoors, and ducting that directs rejected air to the attic space or outdoors. The heat exchanger is pre-heated and/or pre-cooled with indoor space air, thereby increasing the efficiency of the system. Additionally, a pair of parallel heat exchangers are mounted in the air path of the air handler that forces air in the indoor space of the dwelling. The parallel heat exchangers are connected to conduit through which refrigerant flows between the first heat exchanger, a compressor and an expansion valve. The parallel heat exchangers are mounted in the air path, and because they are heated or cooled to the same extent, they heat or cool the air blowing through them to a greater extent than a conventional heating and cooling system.

7 Claims, 2 Drawing Sheets

METHOD AND APPARATUS FOR IMPROVING THE EFFICIENCY OF A HEAT PUMP HVAC SYSTEM

BACKGROUND OF THE INVENTION

1. Field of the Invention

This invention relates generally to heating, ventilation and air conditioning systems, and more particularly relates to a method and apparatus for improving the efficiency of a heat pump heating and cooling system.

2. Description of the Related Art

According to the second law of thermodynamics, heat will not flow from a cool body to a warm body without the input of work. It is also known to heat and cool a house, office, apartment or other dwelling by "pumping" heat from a cool body to a warm body. This is accomplished, most typically, by cyclically compressing and expanding a fluid, and strategically removing thermal energy from, and adding thermal energy to, the fluid, where desired. A heat pump thus extracts thermal energy from one location, such as a warm home, and releases the thermal energy to the warmer outdoor air, for example to cool the home in the summer. Additionally, the heat pump system can be used to extract thermal energy from the outdoor air during cooler months, and release the thermal energy indoors to heat the dwelling.

Because they move thermal energy from a cold source (e.g., the outdoor air) to a hot heatsink (e.g., the indoor furnace coil), heat pumps require energy to perform the work necessary, and this energy is commonly electrical energy used to drive an electric motor. The amount of thermal energy deposited at the warm side is less than the amount of energy taken from the cool side by an amount equal to the work performed. Heat pumps consume less energy to heat a home in many climates than other conventional heating systems.

One common type of heat pump works by exploiting the physical properties of a fluid refrigerant. The working fluid is circulated through the system, which includes two heat exchangers, a compressor and an expansion valve. The working fluid, in its gaseous state, is pressurized and circulated through the system by the compressor. On the discharge side of the compressor, the hot and highly pressurized gas is cooled in one of the heat exchangers (called a "condenser") until it condenses into a high pressure, moderate temperature liquid. The condensed refrigerant then passes through a pressure-lowering device such as an expansion valve, a capillary tube, or a work-extracting device such as a turbine. The low pressure, barely liquid (saturated liquid) refrigerant then passes through another of the heat exchangers (called an "evaporator") where the refrigerant evaporates into a gas via heat absorption. The refrigerant then returns to the compressor and the cycle is repeated.

In such a system it is essential that the fluid reach a sufficiently high temperature when compressed, since the second law of thermodynamics prevents heat from flowing from a cold fluid to a hot heatsink. Similarly, the fluid must reach a sufficiently low temperature when allowed to expand, or heat cannot flow from the cold region into the fluid. In particular, the pressure difference must be great enough for the fluid to condense at the hot side and still evaporate in the lower pressure region at the cold side. The greater the temperature difference, the greater the required pressure difference, and consequentially more energy is needed to compress the fluid. Thus as with all heat pumps, the energy efficiency (amount of heat moved per unit of work required to drive the pump) decreases with increasing temperature difference between the hot side and the cold side.

This temperature difference is rarely an issue in the hottest months, when the desired indoor temperature rarely is more than 40 degrees different from the outdoor temperature. However, in winter in cold climates, the outdoor temperature can be 70 degrees Fahrenheit lower than the desired indoor temperature, and can reach 100 degrees difference. Under these circumstances, heat pumps are not efficient enough to justify their use.

This temperature difference can be reduced if one uses a geothermal system, in which the relatively constant temperature of the earth is used to pre-heat and/or pre-cool water, thereby reducing the temperature difference between the air in the home and the fluid from which energy is taken, or to which energy is given. However, geothermal systems are very expensive to install, making them accessible only to those with the means to invest substantial amount at the outset in exchange for decreased heating and cooling bills in the future.

Additionally, it is a frequent complaint of users of forced air heat pump systems that the temperature of the air coming out of the air ducts during cooler months is not sufficiently warm to create the comfort level normally desired in a dwelling. The temperature of the air at the air ducts is typically only a few degrees warmer than the ambient air. This is in contrast to the temperature at the air ducts of fossil fuel heating systems, which can be 20 to 40 degrees warmer than ambient air.

Therefore, there is a need for a system that has the efficiency of a heat pump system, but which avoids the problem of perceived cold air coming out of the air ducts.

BRIEF SUMMARY OF THE INVENTION

The invention is an improved air temperature maintaining system, such as a heating, cooling and ventilation system, for a dwelling. The dwelling, which can be a house, office, or any other habitable structure, has an indoor space that is defined by walls, a floor and a ceiling surrounded by outdoor space. The system includes a first blower for blowing air through a first air path in the indoor space, and a compressor. The compressor is for compressing refrigerant in a conduit in fluid communication with a first heat exchanger that is mounted in the indoor space in the first blower's path. Thus, the first heat exchanger receives air from the first blower. An expansion valve is also mounted in the conduit.

The improvement comprises a second heat exchanger mounted with its outer surfaces in fluid communication with air in the indoor space. The second heat exchanger has its interior in fluid communication with the refrigerant, and is mounted on the conduit with the compressor and the expansion valve interposed between the first and second heat exchangers. A housing surrounds the second heat exchanger and forms a passage that is in fluid communication with the outdoor space. A second blower is mounted to the housing of the second heat exchanger for blowing indoor space air over the second heat exchanger through a second air path that extends through the housing. In a preferred embodiment, the housing of the second heat exchanger is ducted to form a passage that is in fluid communication with air in the outdoor space. A third heat exchanger is preferably connected to the conduit in parallel with the first heat exchanger and mounted in the indoor space in the first blower's path. The third heat exchanger is mounted downstream from the first heat exchanger for receiving air from the first blower after the air has passed over the first heat exchanger.

Indoor air is closer to the temperature of the refrigerant in the second heat exchanger than outdoor air. Thus, by pre-heating in the heating months, and pre-cooling in the cooling months, the temperature of the air coming out of the heating and cooling system is more comfortable. Additionally, by using another heat exchanger in parallel to the first heat exchanger, the temperature of the air that the heating/cooling system is treating can be changed more due to more exposure. Thus, the invention provides a more comfortable indoor air temperature.

Figure 1:
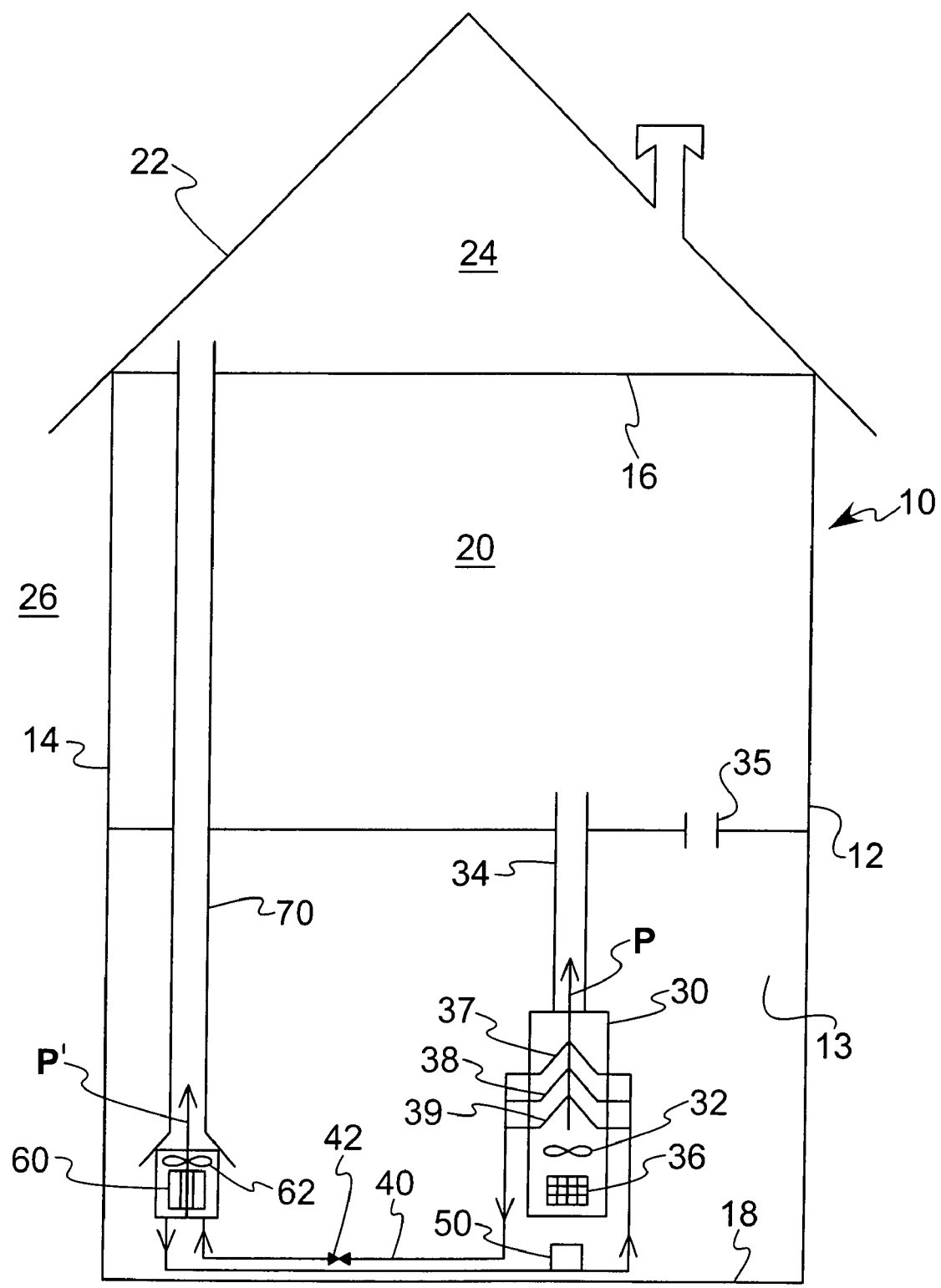
FIG. 1 is a schematic side view illustrating a dwelling in which an embodiment of the present invention is installed in an operable manner.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose. For example, the word connected or term similar thereto are often used. They are not limited to direct connection, but include connection through other elements where such connection is recognized as being equivalent by those skilled in the art.

DETAILED DESCRIPTION OF THE INVENTION

The invention is illustrated in FIG. 1, in which a dwelling, such as the house 10 is depicted schematically. The house 10 has sidewalls 12 and 14 that join with a rear wall 13 and a front wall 15 (not shown in FIG. 1), as well as a ceiling 16 and a floor 18 to define and enclose the indoor space 20. The indoor space 20 is the space of a house, office building, or other dwelling that can be occupied by human beings. Many such dwellings are represented by the illustration of FIG. 1, and include without limitation, office buildings, retail stores, apartments, condominiums, warehouses, outbuildings, and any other enclosed space in which humans can live, work or stay for shelter. The walls, ceiling and floor can be made of conventional building materials, such as wood, metal, concrete, or any combination. Of course, the walls and floor can be soil, if the building is partially embedded in the earth.

A roof 22 is constructed over the ceiling, to define an attic space 24 in a conventional manner. An outdoor space 26 is defined as the space outside of the indoor space 20, and not in another dwelling's indoor space. The attic space 24 is essentially contiguous with the outdoor space 26 in a typical dwelling, because ventilation ports in conventional attics permit relatively free flow of air in the attic space 24 to and from the outdoor space 26. Thus, the attic space 24 can be considered in fluid communication with the outdoor space 26.

An air handler 30 is mounted within the indoor space 20. The air handler 30 is preferably a conventional metal cabinet with a blower, such as the fan 32, that blows air through a path, indicated by the arrow P that is defined by the cabinet of the air handler 30 and ducting 34 that directs the air blown from the air handler 30 into the indoor space 20. The air blown from the air handler 30 is drawn into the cabinet through a return 36, which is commonly called a "cold air return" that can include the cold air ducting 35, which is commonly connected to many rooms throughout the entire dwelling. The air drawn through the return is impelled along the path P that includes the first heat exchanger 37.

The first heat exchanger 37 is preferably a conventional A-coil type heat exchanger, but can be any other heat exchanger through which a refrigerant passes in a sealed path, and over which air can pass without mixing with the refrigerant. In a more preferred embodiment, a second heat exchanger 38 is mounted in the air path of the air handler 30, in parallel to the first exchanger 37. In an alternative embodiment, a third heat exchanger 39 is mounted in the air path of the air handler 30, and the third heat exchanger 39 can be disconnected by valves from a conduit 40 through which conventional refrigerant can flow. There is no limit to the number of heat exchangers that can be mounted in the air handler cabinet, other than the number limited by space. The heat exchangers 37 and 38 are connected in parallel to the conduit 40, and thus the refrigerant flows substantially equally through each of the heat exchangers 37 and 38.

The refrigerant flows into the heat exchangers 37 and 38 when it is compressed by the compressor 50, and flows through a conventional expansion valve 42, as is known in the art. The refrigerant is then forced into a fourth heat exchanger 60, which has a blower, such as the fan 62, that draws air from the indoor space 20 across the heat exchanger 60. The air drawn over the heat exchanger 60 is directed through a path, indicated by the arrow P' through the ducting 70 and into the attic space 24, or alternatively to the outdoor space 26. The ducting 70 forms a passage that is in fluid communication with the outdoor space 26. The ducting 70 can extend from, and thereby draw air from, the cold air return ducting 35. The heat exchanger 60 is cooled or heated by air taken from the indoor space 20, which is important as described below.

Although the compressor 50 is illustrated beneath the air handler 30, it could, of course, be mounted in the air handler, in a cabinet that houses the heat exchanger 60, or in virtually any other location along the conduit. The compressor 50 is interposed between the heat exchangers 37 and 60, and the expansion valve 42 is likewise interposed between the heat exchangers 37 and 60, but on the opposite side of the conduit loop as the compressor 50.

During the heating season when the outdoor space 26 temperature is lower than the desired indoor space 20 temperature, the operation of the system is as follows. Air that is near room temperature is drawn through the path P' that includes the heat exchanger 60, which is cooled by the normal operation of the compressor 50 and refrigerant in the conduit 40. By passing room temperature air over the cooled heat exchanger 60, which serves as an evaporator, thermal energy is transferred to the refrigerant, which is then forced toward the compressor. The cooled air in the path P' is forced upwardly through the ducting 70 into the attic space 24 and out into the outdoor space 26.

The compressor 50 increases the pressure of the refrigerant, thereby also increasing the refrigerant's temperature, and passes the compressed refrigerant through the heat exchangers 37 and 38 substantially equally. As air drawn from the indoor space is blown over the heat exchangers 37 and 38 through the path P, the air is first warmed by impacting the warmed heat exchanger 38, and then is further warmed by impacting the heat exchanger 37. By the time the air in the path P passes out of the cabinet of the air handler 30, it is substantially warmer than the air in the indoor space 20, preferably by 40 to 60 degrees Fahrenheit. The air is preheated by the heat exchanger 38, and then its temperature is increased substantially by the heat exchanger 37. Thus, the parallel heat exchangers 37 and 38 (and others, if desired) heat the air in the indoor space more than would occur by a single heat exchanger. Additionally, the air that passes across the heat exchanger 60 is warmer than the air that would impart thermal energy to the heat exchanger 60 if the heat exchanger 60 were in the outdoor space 26, as is conventional.

The air that is forced into the attic space 24 will be replaced by air that is drawn from the outdoor space through small cracks in the house's 10 foundation, windows, doors, walls, ceilings and floors. In a very tightly sealed house that has too few of these inlets, an air inlet can be deliberately formed in the wall 14 to draw air from the outdoor space 26. This air will combine with indoor air to blow over the heat exchanger 60, but is first pre-heated by yet another heat exchanger (not shown) installed in the ducting 70 to draw even more energy out of the air that is being discarded into the outdoor space. Such a heat exchanger can be of the type sold under the trademark LIFEBREATH.

During the cooling season when the outdoor space 26 temperature is higher than the desired indoor space 20 temperature, the operation of the system is essentially reversed, as will be understood by the person having ordinary skill in the art. For example, instead of the refrigerant in the heat exchangers 37 and 38 being warmer than the air blowing through the path P, the refrigerant is cooler. And instead of the refrigerant in the heat exchanger 60 being cooler than the air in the path P', the refrigerant is warmer. Thus, heat is being pumped from the air in the indoor space 20 to the attic space 24 and to the outdoor space 26. In this manner, the heat exchanger 60 is pre-cooled by the indoor air, and the indoor air in the path P is cooled by the heat exchangers 37 and 38. The air in the path P is cooled to a greater degree than if the air had passed through only one heat exchanger, as is conventional, in the same manner that air is warmed to a greater degree during the heating months, as described above.

In an alternative embodiment of the invention, the heat exchanger 60 can be supplemented with heat exchangers installed in parallel, similarly to the configuration of the heat exchangers 37, 38 and 39. In an alternative embodiment the cold air return is directed by ducting to the heat exchanger 60, so that the air drawn from the cooler areas of the indoor space 20 is used to pre-heat the heat exchanger 60.

In addition to the system described above, it is contemplated that an additional heat exchanger can be placed in the outdoor space in order to take advantage of greater efficiencies under some circumstances. For example, in the spring and fall, the temperature differences between the indoor space air and the outdoor space air can be so small that it is advantageous in many ways to have outdoor space air passing through the path P'. In this case, a heat exchanger, fan and conduit can be placed in the outdoor space for occasional use with the preferred system described above.

In a still further alternative embodiment, the heat exchanger mounted in the outdoor space has air from the indoor space flowing over it. For example, FIG. 2 shows this alternative embodiment, in which the heat exchanger 160 has been mounted in the outdoor space rather than the indoor space as in FIG. 1.

Figure 2:
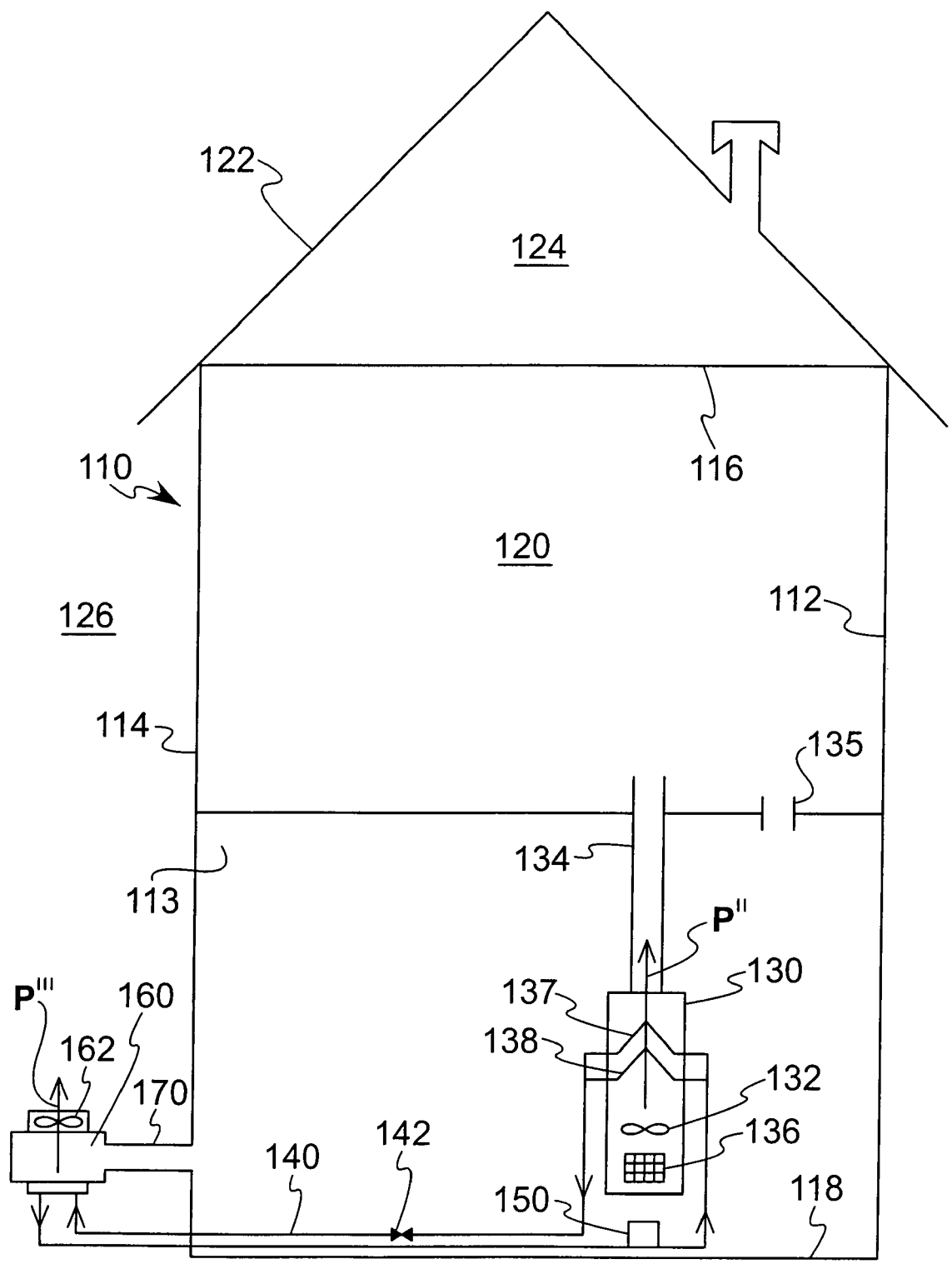
FIG. 2 is a schematic side view illustrating a dwelling in which an alternative embodiment of the present invention is installed in an operable manner.

The alternative embodiment illustrated in FIG. 2 shows a dwelling, such as the house 110, depicted schematically. The house 110 has sidewalls 112 and 114 that join with a rear wall 113 and a front wall 115 (not shown in FIG. 2), as well as a ceiling 116 and a floor 118 to define and enclose the indoor space 120. The indoor space 120 is the same as the indoor space 20 of the FIG. 1 embodiment.

A roof 122 is constructed over the ceiling to define an attic space 124 in a conventional manner. An outdoor space 126 is defined as the space outside of the indoor space 120, and not in another dwelling's indoor space. An air handler 130 is mounted within the indoor space 120. The air handler 130 is preferably a conventional metal cabinet with a blower, such as the fan 132, that blows air through a path, indicated by the arrow, P" that is defined by the cabinet of the air handler 130 and ducting 134 that directs the air blown from the air handler 130 into the indoor space 120. The air blown from the air handler 130 is drawn into the cabinet through a return 136, which is commonly called a "cold air return" that can include the cold air ducting 135, which is commonly connected to many rooms throughout the entire dwelling. The air drawn through the return is impelled along the path P" that includes the heat exchanger 137.

In the embodiment of FIG. 2, a second heat exchanger 138 is mounted in the air path of the air handler 130, in parallel to the exchanger 137. The heat exchangers 137 and 138 are connected in parallel to the conduit 140, and thus the refrigerant flows substantially equally through each of the heat exchangers 137 and 138.

The refrigerant flows into the heat exchangers 137 and 138 when it is compressed by the compressor 150, and flows through a conventional expansion valve 142. The refrigerant is then forced into a second heat exchanger 160, which has a blower, such as the fan 162, that draws air from the indoor space 120 across the heat exchanger 160. The air drawn over the heat exchanger 160 is directed to the outdoor space 126 above it. The ducting 170 extends from the air in the indoor space 120 around the heat exchanger 160, which causes the heat exchanger 160 to be pre-cooled or pre-heated by air from the indoor space 120. The ducting 170 can be connected to the cold air return ducting 135 (not shown). The ducting 170 forms a passage that is in fluid communication with the air in the indoor space.

Thus, the FIG. 2 embodiment ducts air to pre-heat or pre-cool the heat exchanger to the heat exchanger 160 located in the outdoor space 126 rather than ducting air to be rejected to the outdoors from a heat exchanger located in the indoor space 120 (as in the FIG. 1 embodiment). The rejected air is expelled to the outdoor space 126 immediately upon passing over the heat exchanger 160. This embodiment has advantages compared to the FIG. 1 embodiment, such as reducing the amount of indoor space needed for a heat exchanger and ducting.

The ducting discussed above is conventional heating and cooling system ducting, which can be metal, fiber or any suitable material. The heat exchangers are also conventional in their construction, as are the blowers, air handlers and cabinets. The person having ordinary skill will understand that other conventional devices, or substitute devices constructed in the future, can be substituted for those described herein.

This detailed description in connection with the drawings is intended principally as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention and that various modifications may be adopted without departing from the invention or scope of the following claims.

The invention claimed is:

1. An improved heating system for a dwelling in which an indoor space is defined by dwelling walls, a dwelling floor and a dwelling ceiling surrounded by outdoor space, the dwelling walls, floor and ceiling being made of conventional building materials that thermally insulate to substantially limit the transfer of thermal energy from the indoor space to the outdoor space, a first blower moving air through a first air path in a cabinet housing disposed in the indoor space, a compressor compressing fluid refrigerant in a conduit in fluid communication with a first warmed heat exchanger that is enclosed in the cabinet housing in the first air path and receives air, thereby warming the air, and an expansion valve in the conduit, the improvement comprising:
- (a) a cooled heat exchanger during a heating operation with air in the indoor space passing over outer surfaces of the cooled heat exchanger to transfer thermal energy to the refrigerant, and the cooled heat exchanger's interior receiving the refrigerant flowing through the conduit, the cooled heat exchanger being mounted to the conduit with the compressor and the expansion valve interposed between the first warmed heat exchanger and the cooled heat exchanger and the refrigerant in the conduit also flowing through the cooled heat exchanger;
- (b) a second blower moving air in the indoor space over the cooled heat exchanger through a second air path that empties into the outdoor space;
- (c) ducting in fluid communication with the second air path and the outdoor space guiding air in the second air path from the cooled heat exchanger out of the indoor space; and
- (d) a second warmed heat exchanger receiving the flowing refrigerant in the conduit in parallel with the first warmed heat exchanger, thereby receiving refrigerant of substantially the same temperature and pressure as the first warmed heat exchanger, and enclosed in the cabinet housing in the first air path downstream from the first warmed heat exchanger receiving air after the air is warmed by passing over the first warmed heat exchanger and before the air exits the cabinet housing.

2. The improved system in accordance with claim 1, wherein the cooled heat exchanger is mounted in the indoor space.

3. The improved system in accordance with claim 1, wherein the cooled heat exchanger is mounted in the outdoor space.

4. The improved system in accordance with claim 3, further comprising ducting in fluid communication with the second air path and the indoor space guiding air from the indoor space into the second air path.

5. An improved heating system for a dwelling in which an indoor space is defined by dwelling walls, a dwelling floor and a dwelling ceiling surrounded by outdoor space, the dwelling walls, floor and ceiling being made of conventional building materials that thermally insulate to substantially limit the transfer of thermal energy from the indoor space to the outdoor space, a blower moving air through an air path in a cabinet housing disposed in the indoor space, a compressor compressing fluid refrigerant in a conduit in fluid communication with a first warmed heat exchanger that is enclosed in the cabinet housing in the air path, thereby warming the air, and an expansion valve in the conduit, the improvement comprising:
- (a) a cooled heat exchanger during a heating operation mounted in the indoor space with air in the indoor space passing over outer surfaces of the cooled heat exchanger to transfer thermal energy to the refrigerant, and the cooled heat exchanger's interior receiving the refrigerant flowing through the conduit, the cooled heat exchanger being mounted to the conduit with the compressor and the expansion valve interposed between the first warmed heat exchanger and the cooled heat exchanger and the refrigerant in the conduit also flowing through the cooled heat exchanger; and
- (b) a second warmed heat exchanger receiving the flowing refrigerant in the conduit in parallel with the first warmed heat exchanger, thereby receiving refrigerant of substantially the same temperature and pressure as the first warmed heat exchanger, and enclosed in the cabinet housing in the air path downstream from the first warmed heat exchanger receiving air after the air is warmed by passing over the first warmed heat exchanger and before the air exits the cabinet housing.

6. The improved system in accordance with claim 5, wherein the first warmed heat exchanger, the second warmed heat exchanger and the blower are all disposed in the cabinet housing.

7. An improved heating system for a dwelling in which an indoor space is defined by dwelling walls, a dwelling floor and a dwelling ceiling surrounded by outdoor space, the dwelling walls, floor and ceiling being made of conventional building materials that thermally insulate to substantially limit the transfer of thermal energy from the indoor space to the outdoor space, a first blower moving air through a first air path in a cabinet housing disposed in the indoor space, a compressor compressing fluid refrigerant in a conduit in fluid communication with a first warmed heat exchanger that is enclosed in the cabinet housing in the first air path and receives air, thereby warming the air, and an expansion valve in the conduit, the improvement comprising:
- (a) a cooled heat exchanger during a heating operation with air in the indoor space passing over the outer surfaces of the cooled heat exchanger to transfer thermal energy to the refrigerant, and the cooled heat exchanger's interior receiving the refrigerant flowing through the conduit, the cooled heat exchanger being mounted to the conduit with the compressor and the expansion valve interposed between the first warmed heat exchanger and the cooled heat exchanger and the refrigerant in the conduit also flowing through the cooled heat exchanger;
- (b) ducting surrounding the cooled heat exchanger and forming a passage that is in fluid communication with the indoor space;
- (c) a second blower mounted to the ducting of the cooled heat exchanger blowing indoor space air over the cooled heat exchanger through a second air path that extends through the ducting; and
- (d) a second warmed heat exchanger receiving the flowing refrigerant in the conduit in parallel with the first warmed heat exchanger, thereby receiving refrigerant of substantially the same temperature and pressure as the first warmed heat exchanger, and enclosed in the cabinet housing in the first air path downstream from the first warmed heat exchanger receiving air after the air is warmed by passing over the first warmed heat exchanger and before the air exits the cabinet housing.

* * * * *